US010035339B2

(12) United States Patent
Wu et al.

(10) Patent No.: US 10,035,339 B2
(45) Date of Patent: Jul. 31, 2018

(54) LASER CUT ARTICLES

(71) Applicant: 3M INNOVATIVE PROPERTIES COMPANY, St. Paul, MN (US)

(72) Inventors: Pingfan Wu, Woodbury, MN (US); Edward J. Woo, Woodbury, MN (US); Ian R. Owen, Baldwin, WI (US); Bruce E. Tait, Woodbury, MN (US); Frederick P. LaPlant, St. Paul, MN (US); Patrick R. Fleming, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/842,236

(22) Filed: Dec. 14, 2017

(65) Prior Publication Data

US 2018/0104945 A1    Apr. 19, 2018

Related U.S. Application Data

(62) Division of application No. 13/996,898, filed as application No. PCT/US2011/067826 on Dec. 29, 2011, now Pat. No. 9,878,530.

(Continued)

(51) Int. Cl.
*B32B 38/00* (2006.01)
*B32B 3/02* (2006.01)
(Continued)

(52) U.S. Cl.
CPC ............ *B32B 38/0004* (2013.01); *B32B 3/02* (2013.01); *B32B 7/02* (2013.01); *B32B 27/08* (2013.01); *B32B 27/32* (2013.01); *B32B 27/36* (2013.01); *B32B 27/365* (2013.01); *B23K 26/38* (2013.01); *B23K 26/402* (2013.01); *B23K 2203/42* (2015.10); *B23K 2203/50* (2015.10); *B29C 2791/009* (2013.01); *B32B 2250/05* (2013.01); *B32B 2250/24* (2013.01); *B32B 2250/42* (2013.01); *B32B 2270/00* (2013.01); *B32B 2307/412* (2013.01); *B32B 2307/416* (2013.01);
(Continued)

(58) Field of Classification Search
CPC ........ B32B 38/0004; B32B 2310/0843; B32B 3/02; B32B 7/02; B32B 27/08; B32B 27/32; B32B 27/36; B32B 27/365; B23K 26/38; B23K 26/402; B23K 2203/42; B29C 2791/009
USPC ......................................... 264/1.37; 428/192
See application file for complete search history.

(56) References Cited

U.S. PATENT DOCUMENTS 3,610,724 A    10/1971 Frizzell
4,446,305 A     5/1984 Rogers
(Continued)

FOREIGN PATENT DOCUMENTS

JP          07-290258       11/1995
WO       WO 1994/09392      4/1994
(Continued)

OTHER PUBLICATIONS

International Search Report for PCT International Application No. PCT/US2011/067826, dated Apr. 4, 2012, 4 pages.

*Primary Examiner* — Alison L Hindenlang
*Assistant Examiner* — Lawrence D. Hohenbrink, Jr.

(57) ABSTRACT

Laser conversion of multilayer optical film bodies comprising polyester and polycarbonate materials.

9 Claims, 3 Drawing Sheets

Related U.S. Application Data

(60) Provisional application No. 61/428,395, filed on Dec. 30, 2010.

(51) Int. Cl.
  B32B 27/36 (2006.01)
  B32B 27/32 (2006.01)
  B32B 27/08 (2006.01)
  B32B 7/02 (2006.01)
  B23K 26/38 (2014.01)
  B23K 26/402 (2014.01)
  B23K 103/00 (2006.01)
  F21V 8/00 (2006.01)

(52) U.S. Cl.
  CPC ..... *B32B 2307/42* (2013.01); *B32B 2307/514* (2013.01); *B32B 2307/706* (2013.01); *B32B 2310/0843* (2013.01); *B32B 2551/00* (2013.01); *G02B 6/005* (2013.01); *Y10T 428/24777* (2015.01)

(56) References Cited

U.S. PATENT DOCUMENTS

| | | | |
|---|---|---|---|
| 4,540,623 A | 9/1985 | Im | |
| 5,010,231 A | 4/1991 | Huizinga | |
| 5,103,337 A | 4/1992 | Schrenk | |
| 5,360,659 A | 11/1994 | Arends | |
| 5,448,404 A | 9/1995 | Schrenk | |
| 5,882,774 A | 3/1999 | Jonza | |
| 6,157,490 A | 12/2000 | Wheatley | |
| 6,160,240 A | 12/2000 | Momma | |
| 6,368,699 B1 | 4/2002 | Gilbert | |
| 6,538,230 B2 | 3/2003 | Lawson | |
| 6,645,603 B2 | 11/2003 | Koyama | |
| 6,710,294 B2 | 3/2004 | Lawson | |
| 6,737,154 B2 | 5/2004 | Jonza | |
| 6,833,528 B2 | 12/2004 | De Steur | |
| 6,991,695 B2 | 1/2006 | Tait | |
| 7,396,493 B2 | 7/2008 | Tait | |
| 7,724,787 B2 | 5/2010 | Munson | |
| 7,959,694 B2 | 6/2011 | Braunschweig | |
| 8,080,072 B2 | 12/2011 | Woo | |
| 8,729,427 B2 | 5/2014 | Osako | |
| 2002/0130113 A1 | 9/2002 | LaPoint | |
| 2003/0217806 A1* | 11/2003 | Tait | B23K 26/0846 156/254 |
| 2006/0228559 A1 | 10/2006 | Denker | |
| 2008/0216414 A1 | 9/2008 | Braunschweig | |
| 2009/0273836 A1 | 11/2009 | Yust | |
| 2012/0122383 A1 | 5/2012 | Woo | |
| 2013/0264730 A1 | 10/2013 | Wu | |

FOREIGN PATENT DOCUMENTS

| | | |
|---|---|---|
| WO | WO 1995/17303 | 6/1995 |
| WO | WO 1999/36248 | 7/1999 |
| WO | WO 1999/39224 | 8/1999 |
| WO | WO 2003/100521 | 12/2003 |
| WO | WO 2008/126742 | 10/2008 |
| WO | WO 2009/134595 | 11/2009 |
| WO | WO 2011/016572 | 2/2011 |
| WO | WO 2011/017022 | 2/2011 |
| WO | WO 2012/092478 | 7/2012 |

\* cited by examiner

LASER CUT ARTICLES

CROSS REFERENCE TO RELATED APPLICATIONS

This application is a divisional application of U.S. application Ser. No. 13/996,898, filed Jun. 21, 2013, which is a national stage filing under 35 U.S.C. 371 of PCT/US2011/067826, filed Dec. 29, 2011, which claims the benefit of provisional Application No. 61/428,395, filed Dec. 30, 2010, the disclosure of which is incorporated by reference in its/their entirety herein.

FIELD

The present invention relates to methods of cutting or subdividing a film body (e.g., an optical body comprising a multilayer optical film or "optical stack") into a plurality of smaller pieces, and articles comprising such subdivided pieces.

BACKGROUND

Multilayer optical films (i.e., films that provide desirable light transmission and/or reflection properties at least partially by an arrangement of microlayers of differing refractive index) are known and used in an ever increasing variety of applications.

Multilayer optical films have been demonstrated by coextrusion of alternating polymer layers. For example, U.S. Pat. No. 3,610,724 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.) each disclose multilayer optical films. In these polymeric multilayer optical films, polymer materials are used predominantly or exclusively in the makeup of the individual layers. Such films are compatible with high volume manufacturing processes, and can be made in large sheet and roll formats. An illustrative embodiment is shown in FIG. 1.

In typical constructions, the film bodies comprise one or more layers of such multilayer optical films, sometimes referred to as an "optical stack", and further protective layers on one or both sides thereof. Illustrative protective layers include, for example, so-called "skin layers" on one or both sides comprising more robust materials (e.g., polycarbonate or polycarbonate blends) which impart desired additional mechanical, optical, or chemical properties to the construction. U.S. Pat. No. 6,368,699 (Gilbert et al.) and U.S. Pat. No. 6,737,154 (Jonza et al.) disclose illustrative examples thereof. It is also common to include additional outer layers for protection (e.g., removable buffer layers sometimes referred to as "premask layers") which protect the film body during early handling and processing and are then removed during later manufacturing steps. Illustrative examples include polyethylene-based films and polyurethane-based films. An illustrative embodiment is shown in FIG. 2.

Many product applications, however, require relatively small and sometimes numerous pieces of optical film. For these applications, small pieces of multilayer optical film can be obtained from a larger sheet of such film by subdividing the sheet by mechanical means, such as by cutting the sheet with a shearing device (e.g., scissors), slitting the sheet with a blade, or cutting with other mechanical apparatus (e.g., die stamping and guillotines). However, the forces exerted on the film by the cutting mechanism can cause layer delamination in a region along the cut line or edge of the film. This is particularly true for many multilayer optical films. The resultant delamination region is often discernable by a discoloration or other optical degradation relative to intact areas of the film. Because the multilayer optical film relies on intimate contact of the individual layers to produce the desired reflection/transmission characteristics, as a result of degradation in the delamination region it fails to provide those desired characteristics. In some product applications, the delamination may not be problematic or even noticeable. In other applications, particularly where it is important for substantially the entire piece of film from edge-to-edge to exhibit the desired reflection or transmission characteristics, or where the film may be subjected to mechanical stresses and/or wide temperature variations that could cause the delamination to propagate in the film over time, the delamination can be highly detrimental.

U.S. Pat. No. 6,991,695 (Tait et al.) discloses a method for using laser radiation to cut or subdivide optical films using, inter alia, removable liners to support the film and cut pieces. Though laser converting of polymeric materials has been known for some time, see, for example, U.S. Pat. No. 5,010,231 (Huizinga) and U.S. Pat. No. 6,833,528 (De Steur et al.), laser conversion of optical film bodies has not provided desired results. In the region of the optical body near the cutting zone (i.e., the edge) heat generated during the laser converting process often results in degradation of one or more components of the optical film body that impairs desired optical performance. The heat is often observed to disrupt the desired crystalline character of some layers in the optical film, making the component layers in such regions relatively amorphous in character such that desired birefringence is not achieved. As a result, the apparent color of the body in that region is not uniform to other portions of the body located more distantly from the cut zone. Further, the polycarbonate materials commonly used as skin layers tend to yellow upon exposure to the heat encountered during laser conversion, further impairing desired optical performance of the film.

There exists, therefore, a need for an improved method for subdividing multilayer optical film bodies and articles comprising such film. Preferably, the method would not produce delamination or color shifting or yellowing at the cut lines or film edges, would cut the film cleanly without substantial debris accumulation on the film, and would be compatible with automated and/or continuous manufacturing processes.

SUMMARY

The present invention provides methods for cutting or subdividing film bodies comprising optical stacks into one or more discrete pieces using laser radiation and film bodies produced by such methods.

In brief summary, a film body of the invention comprises an optical stack (i.e., a multilayer optical film) having first and second major surfaces and a polycarbonate-based skin layer on at least one, and in many embodiments on both, of the major surfaces of the optical stack. At least one edge portion, formed by laser cutting, connects the first and second major surfaces. At the edge portion the skin layer has a discoloration zone of less than about 25 microns wide and the film has an optically heat affected zone of less than about 100 microns wide.

Briefly summarizing, the method of the invention for subdividing a film body comprises:

(a) providing a film body comprising an optical stack having first and second major surfaces and a polycarbonate-based skin layer on at least one of the major surfaces;

(b) configuring the film body into cutting orientation; and (c) directing pulsed laser radiation at the film body, while the film body is in cutting orientation, to produce one or more cuts in the film body and define one or more edge portions connecting the first and second major surfaces, wherein the laser radiation having a wavelength of from about 9.2 to about 9.3 microns and a power equal to or greater than about 400 W. In accordance with the invention, the laser radiation is selected to provide increased processing speed and reduce thermal stress undergone by portions of the film body adjacent to the location of the cut. In other words, to minimize the heat affected zone.

The present invention provides several advantages including making possible the use of laser converting of optical film bodies with its attendant speed, cost, and precision advantages to convert or cut film bodies comprising optical stacks into discrete pieces of desired size and configuration that exhibit superior, heretofore unattained, edge-to-edge optical performance.

BRIEF DESCRIPTION OF DRAWING

The invention is further explained with reference to the drawing wherein.

These figures are intended to be merely illustrative and not limiting.

DETAILED DESCRIPTION OF ILLUSTRATIVE EMBODIMENTS

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Film Body

Figure 2:
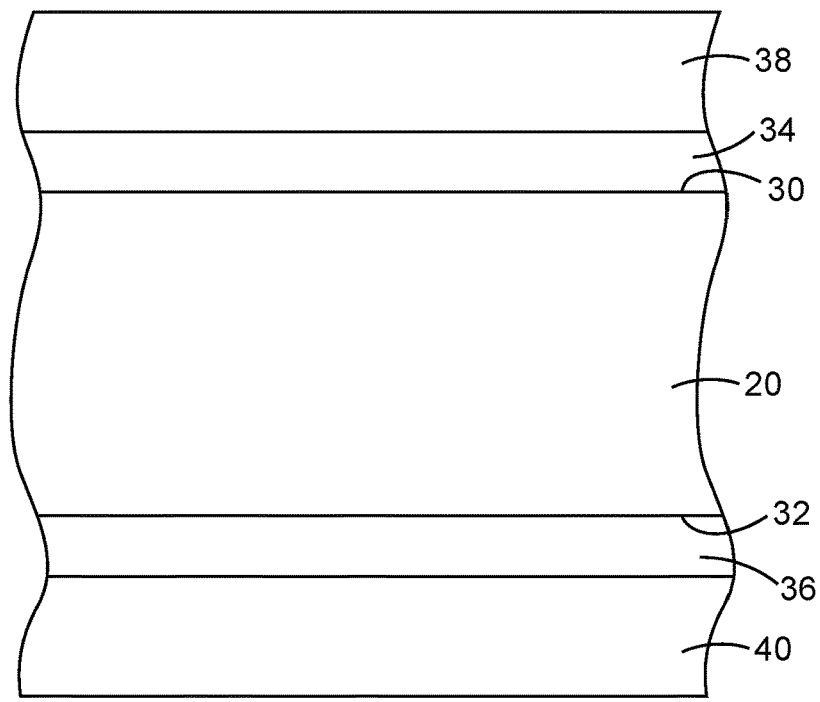
FIG. 2 is a cross sectional view of a portion of an illustrative multilayer optical film body.

Film bodies used in the present invention comprise a multilayer optical film or stack having first and second major surfaces and a polymeric skin layer on at least one, and typically on both, of the major surfaces. The film bodies will typically further comprise a premask layer on the outside of the skin layer(s). An illustrative embodiment is shown in FIG. 2. The film and skin layer have different absorbance spectra which makes laser converting problematic.

As used herein, "multilayer optical film" refers to an extended optical body whose thickness is generally no more than about 0.25 mm (10 thousandths of an inch, or mils). In some instances, a film can be attached or applied to another optical body such as a rigid substrate or another film having suitable reflection or transmission properties. The film can also be in a physically flexible form, whether it is free-standing or attached to other flexible layer(s).

Figure 1:
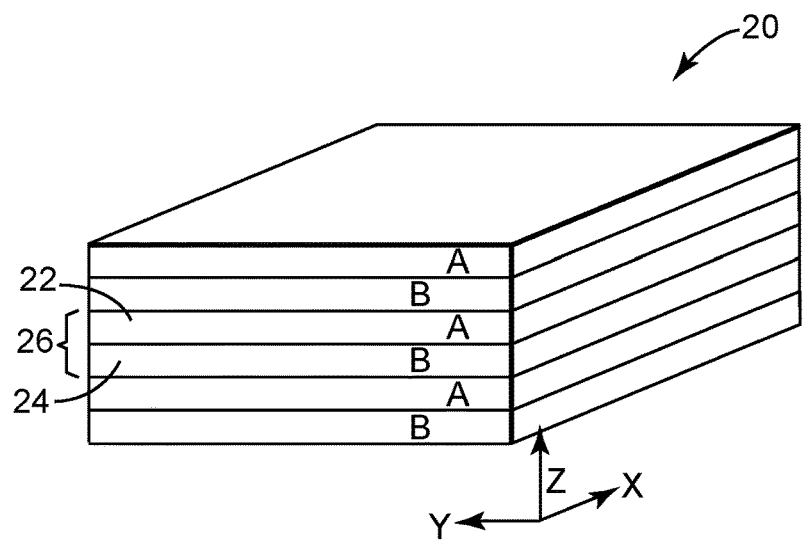
FIG. 1 is a greatly magnified perspective view of an illustrative multilayer optical film.

FIG. 1 depicts an exemplary multilayer optical film 20 for use in the present invention. The film comprises a plurality of individual microlayers 22, 24. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film 20 can also comprise one or more thick adhesive layers to bond two or more sheets of multilayer optical film in a laminate.

The reflective and transmissive properties of multilayer optical film 20 are a function of the refractive indices of the respective microlayers. Each microlayer can be characterized at least at localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 1). In practice, the refractive indices are controlled by judicious materials selection and processing conditions. Film body 20 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index ($\Delta n_x$) for light polarized along the x-axis of at least 0.05. If the high reflectivity is desired for two orthogonal polarizations, then the adjacent microlayers also preferably exhibit a difference in refractive index ($\Delta n_y$) for light polarized along the y-axis of at least 0.05. Otherwise, the refractive index difference ($\Delta n_y$) can be less than 0.05 and preferably about 0 to produce a multilayer stack that reflects normally incident light of one polarization state and transmits normally incident light of an orthogonal polarization state.

If desired, the refractive index difference ($\Delta n_z$) between adjacent microlayers for light polarized along the z-axis can also be tailored to achieve desirable reflectivity properties for the p-polarization component of obliquely incident light. For ease of explanation in what follows, at any point of interest on an interference film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$ (i.e., $\Delta n_x \geq 0$).

To maintain high reflectivity of p-polarized light at oblique angles, the z-index mismatch $\Delta n_z$ between microlayers can be controlled to be substantially less than the maximum in-plane refractive index difference $\Delta n_x$, such that $\Delta n_z \leq 0.5 \cdot \Delta n_x$. More preferably, $\Delta n_z \leq 0.25 \cdot \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$ (i.e., $\Delta n_z < 0$). This condition yields interfaces whose reflectivity for p-polarized light increases with increasing angles of incidence, as is the case for s-polarized light.

Exemplary materials that can be used in the fabrication of polymeric multilayer optical film can be found in PCT Publication WO 99/36248 (Neavin et al.). Desirably, at least one of the materials is a polymer with a stress optical coefficient having a large absolute value. In other words, the polymer preferably develops a large birefringence (at least about 0.05, more preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layers of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, . . . as shown in FIG. 1. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/EASTAR™ and PET/EASTAR™ where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "PS" refers to syndiotactic polystyrene and its derivatives, and EASTAR™ is a polyester or copolyester (believed to comprise cyclohexanedimethylene diol units and terephthalate units) from Eastman Chemical Co.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/ECDEL™ PET/ECDEL™ PEN/sPS, PET/sPS, PEN/coPET, PEN/PETG, and PEN/THV™ where "PMMA" refers to polymethyl methacrylate, ECDEL™ is a thermoplastic polyester or copolyester (believed to comprise cyclohexanedicarboxylate units, polytetramethylene ether glycol units, and cyclohexanedimethanol units) from Eastman Chemical Co., and THV™ is a fluoropolymer from 3M Company.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In a simple embodiment, the microlayers can have thicknesses corresponding to a ¼-wave stack, arranged in optical repeat units or unit cells each consisting essentially of two adjacent microlayers of equal optical thickness (f-ratio=50%), such optical repeat unit being effective to reflect by constructive interference light whose wavelength ($\lambda$) is twice the overall optical thickness of the optical repeat unit. Such an arrangement is shown in FIG. 1, where microlayer 22 of polymer A adjacent to microlayer 24 of polymer B forms a unit cell or optical repeat unit 26 that repeats throughout the stack. Thickness gradients along a thickness axis of the film (e.g., the z-axis) can be used to provide a widened reflection band. Thickness gradients tailored to sharpen such band edges can also be used, as discussed in U.S. Pat. No. 6,157,490 (Wheatley et al.).

Other layer arrangements, such as multilayer optical films having 2-microlayer optical repeat units whose f-ratio is different from 50%, or films whose optical repeat units consist essentially of more than two microlayers, are also contemplated. These alternative optical repeat unit designs can reduce or eliminate certain higher-order reflections. See, for example, U.S. Pat. No. 5,360,659 (Arends et al.) and U.S. Pat. No. 5,103,337 (Schrenk et al.).

In many embodiments, depending upon the desired application, the optical stack has a thickness from about 2 to about 120 microns (200 nm to 50 mil) and in many embodiments a thickness of about 0.5 mil (12.7 microns) is preferred.

FIG. 2 shows an illustrative film body of the invention comprising multilayer optical stack 20, having first major surface 30 and second major surface 32. In this embodiment, the film body comprises two polymeric skin layers 34, 36 on major surfaces 30, 32, and further comprises optional premask layers 38, 40. In an illustrative embodiment, the optical stack comprises 50% low melt PEN and 50% PETG and is 0.5 mil thick, the skin layers comprise SA115 polycarbonate and are 0.2 mil thick, and the premask comprises polyethylene and is 31 microns thick.

Skin layers, typically comprising polycarbonate or polycarbonate blends, are typically used on at least one and typically both sides of the optical stack during manufacturing, handling, converting, etc. of the film and during use in the final application. The robust physical performance of such films protects the optical stack from degradation such that desired optical performance properties are maintained.

In many instances, a premask layer is provided on the outside of the skin layer(s). Illustrative examples include polyethylene (e.g., LDPE, MDPE, and HDPE) and polyurethane materials to cover the skin layer (which along with the optical stack typically becomes part of the final article) during fabrication. Polyethylene is typically preferred as it is relatively low cost and flexible. Because of its troublesome response to cutting by laser, if a polyester premask is used it is often removed (e.g., peeled back) during laser converting in accordance with the invention.

In accordance with the present invention, the skin layer(s) is selected to have an absorbance spectra which is different than that of the multilayer optical film stack. The absorption of the material to laser energy follows Beers Law. Typically, it is desired that the film absorbs at least 63% of the laser energy when laser penetrates through the film. In the present invention, we would like the material to have absorption coefficient higher than 0.04 per micron.

Laser Radiation

The method of the invention comprises:

(a) providing a film body comprising a multilayer optical film having first and second major surfaces and a polymeric skin layer on at least one of the major surfaces, wherein the film and skin layer have different absorbance spectra;

(b) configuring the film body into cutting orientation; and (c) directing pulsed laser radiation at the film body, while the film body is in cutting orientation, to produce one or more cuts in the film body and define an edge portion, the laser radiation having a wavelength of from about 9.2 to about 9.3 microns and a power equal to or greater than about 400 W.

Configuring the film body into cutting orientation comprises taking the provided workpiece and placing it in effective position and orientation for irradiation with a laser source as described herein. In embodiments where the film body is provided in roll form, configuring the body into cutting orientation will comprise unrolling a portion from the roll and placing it in effective position and orientation in the cutting zone. As will be understood by those skilled in the art, the method of the present invention may be carried out in either a substantially continuous or a staged or step process, depending upon the available equipment for handling and configuring the film body, laser irradiation, and for handling the resultant pieces.

Applicants have found laser radiation to be useful in cutting and subdividing polymeric multilayer optical film bodies without any substantial delamination at the laser cut edge lines. The laser radiation is selected to have a wavelength at which at least some of the materials of the optical film have substantial absorption so that the absorbed electromagnetic radiation can effectively vaporize or ablate the film body along the cut line. Otherwise, the laser radiation would be transmitted or reflected by the film just as other incident light, whose wavelength is within an intended operating range of the film. The laser radiation is also shaped with suitable focusing optics and controlled to suitable power levels to accomplish the vaporization along a narrow cut line. Preferably, the laser radiation can also be rapidly scanned across the workpiece according to pre-programmed instructions, and switched on and off rapidly so that cut lines of arbitrary shape can be followed. Commercially available systems found to be useful in this regard are being marketed as the LaserSharp™ laser processing modules by LasX Industries Inc., St. Paul, Minn. These modules use a $CO_2$ laser source operating at a wavelength of about 10.6 µm (from about 9.2 to about 11.2 µm) to cut the workpiece.

Figure 3:
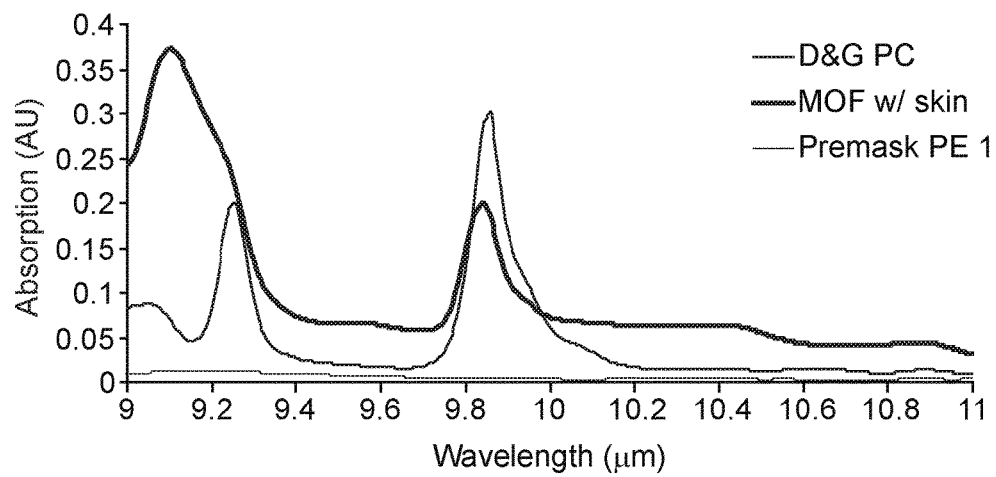
FIGS. 3 and 4 are graphs showing the absorption spectra of polymeric materials often used in film bodies.
Figure 4:
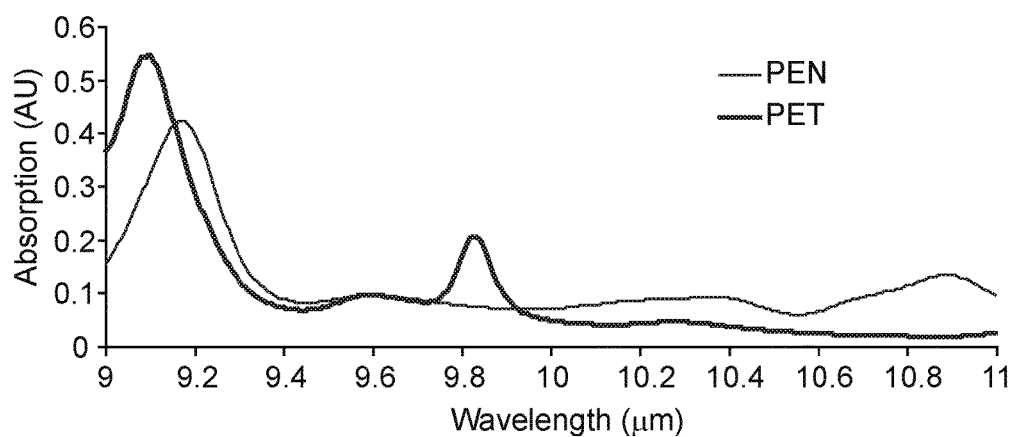

FIGS. 3 and 4 show illustrative absorption spectra of polymeric materials commonly used in optical film bodies. In FIG. 3 is shown the absorption spectra of common polyethylene premask materials, SA115 polycarbonate skin layer, and typical multilayer optical film (i.e., the optical stack (e.g., comprising PET, PEN, and coPEN)) with skin. In FIG. 4 is shown the absorption spectra of PET and PEN.

Multilayer optical stacks are configured to be transparent to multi-color light in one polarization but to be strongly reflective in another polarization. A problem with conventional laser cutting of such stacks and optical bodies comprising them is that the effect of the temperature cycle and rapid quenching typically encountered during conventional laser cutting results in degradation of the portions of the body near the laser cut edge, resulting in variation of the optical properties within the affected portions of the stack (e.g., leading to a loss in optical power of the stack in portions near the cut edge). Such variations in performance are at a minimum aesthetically undesirable and may impair the functional utility of the cut optical body. The present invention surprisingly provides a way to attain the performance advantages of laser converting while minimizing the degree of edge degradation which would otherwise be expected.

As a result, high performing film bodies can be efficiently and productively made in a variety of configurations.

Typically, laser radiation used in the invention will have a wavelength of from about 9.2 to about 9.3 µm, preferably about 9.25 µm. We have surprisingly found that superior cutting of optical film bodies as described above is obtained using this wavelength (i.e., at a wavelength at which polycarbonate strongly absorbs but which is relatively higher than the 9.1 to 9.2 µm range of peak absorbance of the main optical core). As a result, it has been surprisingly found that effective cutting of such film bodies can be achieved with laser radiation while not incurring the substantial degradation of optical performance at cut edges which was expected.

During application of the laser radiation, the targeted portion of the film body is heated dramatically, resulting in effective ablation or vaporization of film body material.

Typically, the laser radiation used in the invention will have a pulsed duty cycle of about 50% or less. Using a reduced duty cycle provides more time in which residual heat can be more effectively removed away from the laser cut edges rather than building up in the portions of the optical film body adjacent the laser cut edges.

Typically, the laser radiation used in the invention will have a focus spot size of about 250 µm or less.

Typically, the laser radiation used in the invention will have a pulse rate of at least about 20 kHz, preferably a pulse rate of at least about 200 kHz. Using a faster pulse rate leads to a quicker temperature increase in the cutting target portion of the film body leading to it being vaporized and ablated away before potentially damaging quantities of heat propagate into the edge portions of the film body.

Typically, the laser radiation used in the invention will have a pulse width of about 20 microseconds or less.

Typically, the laser radiation used in the invention will have an average power of at least 400 Watts. Such high power serves to rapidly vaporize and ablate cutting target portions of the film body before potentially damaging quantities of heat propagate into the edge portions of the film body.

In some embodiments, the laser radiation will be directed utilizing a cutting speed of at least about 1 meter/sec. As will be understood, this can be carried out by simultaneously moving both the laser radiation and web relative to one another or by holding one stationary while the other is moved accordingly.

In some embodiments wherein the directing step is performed at a laser cutting station and the directing step further comprises providing an air flow in a first direction across the laser station. Such use of "assist" gases is known to those skilled in the art with illustrative examples of suitable gases including air, nitrogen gas, and oxygen gas. Use of such measures can minimize the tendency of vaporized material from depositing on the surface of the film body wherein it might condense and form deposits thereon that would impair desired physical and optical properties.

As will be understood, other suitable known techniques for handling optical films, bodies formed therefrom, etc. may be used in accordance with the present invention. For example, U.S. Pat. No. 6,991,695 (Tait et al.) discloses use of electrostatically active liners to support the cut film bodies, this technique may be used with the present invention if desired.

During the laser irradiation process, the portions of the film body targeted by the laser radiation are ablated, forming a cut in the film body that ultimate extends completely through the body from the first to the second major face thereof.

Figure 5:
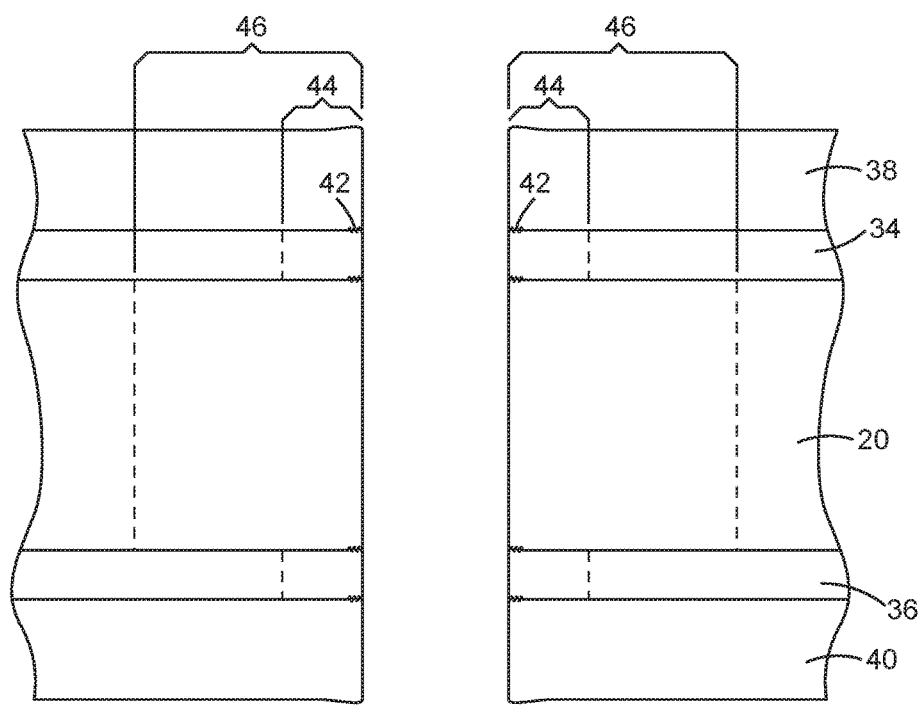
FIG. 5 is a cross sectional view of laser cut edge portions formed in the optical film body shown in FIG. 2 in accordance with the invention.

As illustrated in FIG. 5, several advantageous features result.

The layers within the film body are fused along the resultant edge portions 42, extending from one major surface to the other major surface of the optical body. This reduces the likelihood of deleterious delamination that is commonly encountered with mechanical cutting methods. Such delamination can impair optical performance of the resultant optical body, particularly as the delamination defect propagates from the cut edge. In addition, such defects present opportunities for dirt and other contaminants to become entrained in the optical body.

Another advantageous feature is found in the polycarbonate skin layer(s). Because of reduced thermal energy encountered in the portions surrounding the laser cut edge as compared to conventional laser cutting methods, each polycarbonate-based skin layer has a discolorization zone 44 that has width of only about 25 microns or less. Typically, features of such small dimension are not readily visible to the naked eye. Thus, an important aesthetic benefit is attained.

A further advantageous feature is found in the optical stack 20. Because of the reduced thermal energy encountered in the portions of the optical stack 20 surrounding the laser cut edge as compared to conventional laser cutting methods, the resultant edge portions 46 of the optical stack have smaller heat affected zones, typically having a width of about 100 microns or less.

An additional advantage is that due to the effective vaporization and ablation achieved with the present invention, vaporized target film body material can be effectively removed from the cutting operation (e.g., using an assist gas) and as a result the surfaces of the film body exhibit little, if any, thickening at the edge cuts.

EXAMPLES

The following experiments were carried out to evaluate laser converting of optical film bodies such as illustrated in FIG. 2. The spectra are shown in FIGS. 3 and 4.

The film bodies each comprised (a) an optical stack comprising 50% low melt PEN and 50% PETG and 0.5 mil in thickness, (b) two skin layers each comprising SA115 polycarbonate and 0.2 mil thick, and (c) two premask layers each comprising polyethylene and 31 microns thick.

Study of the spectra yield the following observations:
(1) None of the four materials (PE, PET, PEN, PC), exhibits good absorption at 10.6 microns.
(2) PE has very low absorption in the long wave IR region.
(3) PC has its strongest absorption in the 9.25 and 9.9 microns.
(4) PEN has its strongest absorption at 9.2 microns, while PET absorbs at 9.1 microns. At 9.25 microns, both PET and PEN have moderate absorptions.

Example 1: Conversion at 9.27 Micron Wavelength

The laser was a PRECO™ EAGLE™ laser and the scanner was a SCANLAB™ HURRYSCAN™ 30. Laser output power was 224 W, modulation rate ~50%, focused spot size 160 microns, and M2 of <1.1. The laser focused spot scanning speed was tested at 20 inches/sec, 40 inches/sec, 60 inches/sec, 80 inches/sec, and 100 inches/sec, respectively.

When the speed was less than 80 inches/sec, the laser achieved cutting through the layers of the optical film body but yellowing of the edge region was apparent due to the discolorization of the skin layers at the laser cut edge.

Example 2: Conversion 10.6 Micron Wavelength

The laser was a COHERENT™ E400 laser and the scanner was SCANLAB™ HURRYSCAN™ 30. Laser output power was 226 W, modulation rate ~20%, focused spot size 160 microns, and M2 of <1.1. The laser focused spot scanning speed was tested at 20 inches/sec, 40 inches/sec, 60 inches/sec, 80 inches/sec, and 100 inches/sec, respectively.

None of the PE, PET, PEN, or PC polymeric materials exhibits significant absorption at this wavelength region. However, in this experiment the laser modulation was only 20% as compared to 50% in 9.27 micron laser experiment.

When the speed was less than 60 inches/sec, the laser achieved cutting through the layers of the optical film body but yellowing of the edge region similar to that when converted at 9.27 microns was apparent.

Example 3: Conversion at 9.27 Micron Wavelength

The laser was a PRECO™ EAGLE™ laser and the scanner was a SCANLAB™ HURRYSCAN™ 30. Laser output power was 224 W, modulation rate ~50%, focused spot size 160 microns, and M2 of <1.1.

In this example, the top premask PE layer was peeled off and air used as an assist gas to blow off the vapors generated in the laser converting process.

At speed of at least 400 inches/sec (the maximum of the scanner), a cut was made through the top or exposed skin layer, the optical stack, and the bottom skin layer. The bottom premask PE layer was not cut through. No yellowing at the edge region was observed; the optical properties of the film body were preserved, as compared to the results obtained in Example 1.

Example 4: Conversion at 10.6 Micron Wavelength

The laser was a COHERENT™ E400 laser and the scanner was SCANLAB™ HURRYSCAN™ 30. Laser output power was 226 W, modulation rate ~20%, focused spot size 160 microns, and M2 of <1.1.

In this example, the top premask PE layer was peeled off and air used as an assist gas to blow off the vapors generated in the laser converting process.

At speed 300 inches/sec (the maximum of the scanner), a cut was made through the top or exposed skin layer, the optical stack, and the bottom skin layer. Some melt back and yellowing at the edge was observed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated be reference.

What is claimed is:

1. A film body comprising (1) a multilayer optical stack having first and second major surfaces, the optical stack comprising alternating layers of at least a first polymer and a second polymer, the first and second polymers having different refractive index characteristics, and (2) a polymeric skin layer comprising polycarbonate or polycarbonate blend on at least one of the major surfaces of the optical stack, wherein the optical stack and skin layer have different absorbance spectra, the film body having at least one edge portion connecting the first and second major surfaces, wherein at the edge portion the skin layer has a discoloration zone that has a width of about 25 microns or less and the optical stack has an optically heat affected zone that has a width of less than about 100 microns, wherein the first and second polymers differ in composition and at least one of the first polymer and second polymer is selected from the group consisting of PEN, coPEN, PET, and coPET.

2. The film body of claim 1 comprising two or more of the following: polycarbonate, polyester, polyethylene terephthalate, and pentacene.

3. The film body of claim 1 wherein at least one of the first and second polymers has a stress-induced birefringence.

4. The film body of claim 1 wherein the optical stack comprises layers of the first polymer, a semi-crystalline polymer, having an average thickness of not more than 0.5 microns and layers of the second polymer having an average thickness of not more than 0.5 microns, wherein said optical stack has been stretched in at least one direction to at least twice that direction's unstretched dimension.

5. The film body of claim 4 wherein the optical stack has been stretched in at least two directions.

6. The film body of claim 1 having a thickness from about 2 to about 120 microns.

7. The film body of claim 1 wherein each layer of the optical stack has a thickness of no more than 0.5 microns.

8. The film body of claim 1 further comprising a removable premask on at least one side thereof.

9. The film body of claim 1 the layers within the multilayer optical stack are fused along the at least one edge portion.

* * * * *